United States Patent
Fujita et al.

(10) Patent No.: US 6,828,964 B2
(45) Date of Patent: Dec. 7, 2004

(54) INFORMATION PROCESSING DEVICE AND DATA OBJECT DISPLAY METHOD

(75) Inventors: Takushi Fujita, Kawasaki (JP); Toru Kamiwada, Kawasaki (JP); Takuya Sakamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 178 days.

(21) Appl. No.: 10/083,540

(22) Filed: Feb. 27, 2002

(65) Prior Publication Data

US 2003/0098863 A1 May 29, 2003

(30) Foreign Application Priority Data

Nov. 28, 2001 (JP) ........................................ 2001-363240

(51) Int. Cl.[7] .............................................. G06T 15/00
(52) U.S. Cl. ....................................... 345/419; 345/427
(58) Field of Search ................................ 345/427, 419, 345/473, 474, 422, 420, 421, 423, 424, 757, 426, 778, 428, 781, 782

(56) References Cited

U.S. PATENT DOCUMENTS 6,252,599 B1 * 6/2001 Natsuko et al. ............. 345/419
6,256,043 B1 * 7/2001 Aho et al. .................. 345/629

FOREIGN PATENT DOCUMENTS

| JP | 11-24878 | 1/1999 |
|---|---|---|
| JP | 2001-172248 | 6/2000 |
| JP | 2000-207269 | 7/2000 |
| JP | 2000-60166 | 3/2001 |
| JP | 2001-84073 | 3/2001 |
| JP | 2001-209470 | 8/2001 |

* cited by examiner

*Primary Examiner*—Mark Zimmerman
*Assistant Examiner*—Enrique L. Sautiago
(74) *Attorney, Agent, or Firm*—Staas & Halsey LLP

(57) ABSTRACT

A configuration is presented that enables viewing a plurality of data objects situated in a virtual space as the visual field defined in the virtual space is changed smoothly; and that at the same time enables: supplemental information in connection with displayed data objects to be displayed; information in connection with displayed data objects to be displayed in more detail; means for dialogue with a user to be provided in situations where required; and application programs linked to the display of information and associated with that information to be executed. Included are: a step of accepting virtual-viewpoint position changes; a step of continuously changing visual field based on the virtual-viewpoint position changes, and uninterruptedly changing the display of a data object positioned within the visual field; a step of determining whether a data object positioned within the visual field satisfies predetermined geometric conditions for the visual field; and in respect of a data object that satisfies the predetermined geometric conditions, a step of executing a process preset in that data object.

12 Claims, 14 Drawing Sheets

INFORMATION PROCESSING DEVICE AND DATA OBJECT DISPLAY METHOD

BACKGROUND OF THE INVENTION

1. Technical Field

The present invention relates to a display method and display control device for displaying, in accordance with a visual field from a set viewpoint, data objects situated in a three-dimensional virtual space.

2. Description of Related Art

Computers connected to networks, such as the Internet for example, are capable of retrieving massive amounts of diverse information. In addition, as the capacity of storage media increases, even stand-alone information machines have become able to utilize vast amounts of diverse information.

In order to make use of such large amounts of diverse information, GUIs (graphical user interfaces) that employ a desktop metaphor, such as Microsoft Windows™ are being used, as are web browsers such as Microsoft Internet Explorer™ and Netscape Navigator™. These applications display viewing target informational content arranged on a screen in a static and planar manner; and in order to view the informational-content items in turn, succeeding subject matter must be displayed by replacing the subject matter being displayed in the active window, or must be displayed by changing the active attribute of windows being displayed on the screen in an overlapping manner.

When a plurality of informational items is displayed by switching from one display to another, the sense of continuity on the screen is lost, leading to the problem of a user having trouble understanding how the individual contents are related to each other.

In order to solve such problems, an information display method has been proposed (Japanese Pat. App. No. 2001-162322 [filed May 30, 2001]; Laid-Open No. 2000-172248) wherein concatenatedly linked data objects are arranged in a three-dimensional virtual space, and based on a visual field defined in the virtual space, the data objects are displayed on a display screen; and wherein information can be perused by following along links while the display screen is changed uninterruptedly by changing the visual field smoothly.

A conventional technique of this sort will be explained using FIGS. 5 and 6. FIG. 5 is a conceptual view of a link structure of concatenatedly linked data objects, and FIG. 6 is example displays of the concatenatedly linked data objects.

In FIG. 5, data objects 102 and 103 are represented within data object 101 as links 112 and 113, respectively, and data objects 104 and 105 are represented within data object 102 as links 114 and 115, respectively. Data object 106 is represented within data object 104 as link 116.

In display example 301 at (A) in FIG. 6, data object 101 and data objects 102 and 103 linked to data object 101 are displayed.

When a shift-viewpoint instruction is accepted, the display range is changed according to the instruction, transitioning, for example, to the state shown in display example 302 at (B) in FIG. 6. In this display example 302, data object 101, data object 102 linked to data object 101, and data objects 104 and 105 linked to data object 102 are displayed.

When a further shift-viewpoint instruction is accepted, the state shown in display example 303 at (C) in FIG. 6 ensues. In this display example 303, data object 102, data object 104 linked to data object 102, and data object 106 linked to data object 104 are displayed.

When a further shift-viewpoint instruction is accepted, the state shown in display example 304 at (D) in FIG. 6 ensues. In this display example 304, data object 104 and data object 106 linked to data object 104 are displayed.

In display examples 301 through 304, the data object that occupies the largest area within the display screen is displayed in detail, and the preceding/following relationships of the data objects are set in correspondence with the link modes and displayed. The fact that the display within the field of view always changes smoothly in response to the shift-viewpoint instructions enables a user to follow the links and view the data objects.

The information display method described above readily enables viewing by following concatenatedly linked information, and enables remedying the problem of losing sight of the interrelationships among the informational-content items. However, this method does not take into consideration such matters as: displaying supplemental information in connection with displayed data objects; displaying information in more detail in connection with displayed data objects; providing means for dialogue with a user in situations where required; or executing application programs linked to the display of information and associated with that information.

SUMMARY OF THE INVENTION

The present invention offers a configuration that enables viewing a plurality of data objects situated in a virtual space as the visual field defined in the virtual space is changed smoothly; and that at the same time enables: supplemental information in connection with displayed data objects to be displayed; information in connection with displayed data objects to be displayed in more detail; means for dialogue with a user to be provided in situations where required; and application programs linked to the display of information and associated with that information to be executed.

A first aspect of the present invention is a data-object display method for situating a plurality of data objects within a three-dimensional virtual space in which a visual field is defined and displaying, from a set virtual viewpoint, data objects located within the visual field. The data-object display method includes: a step of accepting virtual-viewpoint location changes; a step of continuously changing the visual field based on the virtual-viewpoint location changes, and uninterruptedly changing the display of a data object located within the visual field; a step of distinguishing whether a data object located within the visual field satisfies predetermined geometric conditions for the visual field; and a step of executing, in respect of a data object satisfying the predetermined geometric conditions, a process preset in the data object.

In a second aspect, the invention is the data-object display method according to the first aspect, wherein the process preset in the data object displays a display image different from a virtual-space display image located within the visual field.

A third aspect is the data-object display method according to the second aspect, wherein the a separate image is displayed situated in front of the data object located within the visual field in the virtual space.

In a fourth aspect, the invention is the data-object display method according to the second aspect, wherein a separate image is displayed within a window different from a window in which the data object located within the visual field in the virtual space is displayed.

A fifth aspect of the invention is the data-object display method according to the second aspect, wherein a separate image is displayed within a frame different from, in an identical window with, a frame in which the data object located within the visual field in the virtual space is displayed.

In a sixth aspect, the invention is according to the second aspect, wherein at least one from among a message, a modal dialogue, a modeless dialogue or information related to the data object is displayed.

A seventh aspect of the invention is the data-object display method according to any of the foregoing aspects, wherein the process preset in the data object executes a preset application program.

An eighth aspect of the present invention is an information display device for situating a plurality of data objects within a three-dimensional virtual space in which a visual field is defined and displaying, from a set virtual viewpoint, data objects located within the visual field. The information display device in this aspect of the invention includes: visual-field-data updating means for accepting virtual-viewpoint location changes; object data processing means for continuously changing the visual field based on the virtual-viewpoint location changes, and uninterruptedly changing the display of a data object located within the visual field; process-execute-conditions judging means for distinguishing whether a data object located within the visual field satisfies predetermined geometric conditions for the visual field; and visual-field-shift-linked process-executing means for executing, in respect of a data object satisfying the predetermined geometric conditions, a process preset in the data object.

An ninth aspect of the present invention is an information display device for situating a plurality of data objects within a three-dimensional virtual space in which a visual field is defined and displaying on a display screen, from a set virtual viewpoint, data objects located within the visual field. The information display device herein includes: visual-field-data updating means for accepting virtual-viewpoint location changes; object data processing means for continuously changing the visual field based on the virtual-viewpoint location changes, and uninterruptedly changing the display of a data object located within the visual field; process-execute-conditions judging means for distinguishing whether or not there is a data object located in the display-screen center and occupying a proportion of the display screen that is a predetermined value or more; and visual-field-shift-linked process-executing means for executing a process preset in the data object, based on judgment results from said process-execute-conditions judging.

An tenth aspect of the present invention is an information display device for situating a plurality of data objects within a three-dimensional virtual space in which a visual field is defined and displaying, from a set virtual viewpoint, data objects located within the visual field. The information display device in the aspect of the present invention includes: visual-field-data updating means for accepting virtual-viewpoint location changes; object data processing means for continuously changing the visual field based on the virtual-viewpoint location changes, and uninterruptedly changing the display of a data object located within the visual field; and visual-field-shift-linked process-executing means for executing, if the distance of a data object located in the visual field from the virtual viewpoint becomes a predetermined value, a process preset in the data object.

From the following detailed description in conjunction with the accompanying drawings, the foregoing and other objects, features, aspects and advantages of the present invention will become readily apparent to those skilled in the art.

DETAILED DESCRIPTION OF THE PREFERRED EMBODIMENTS

Figure 1:
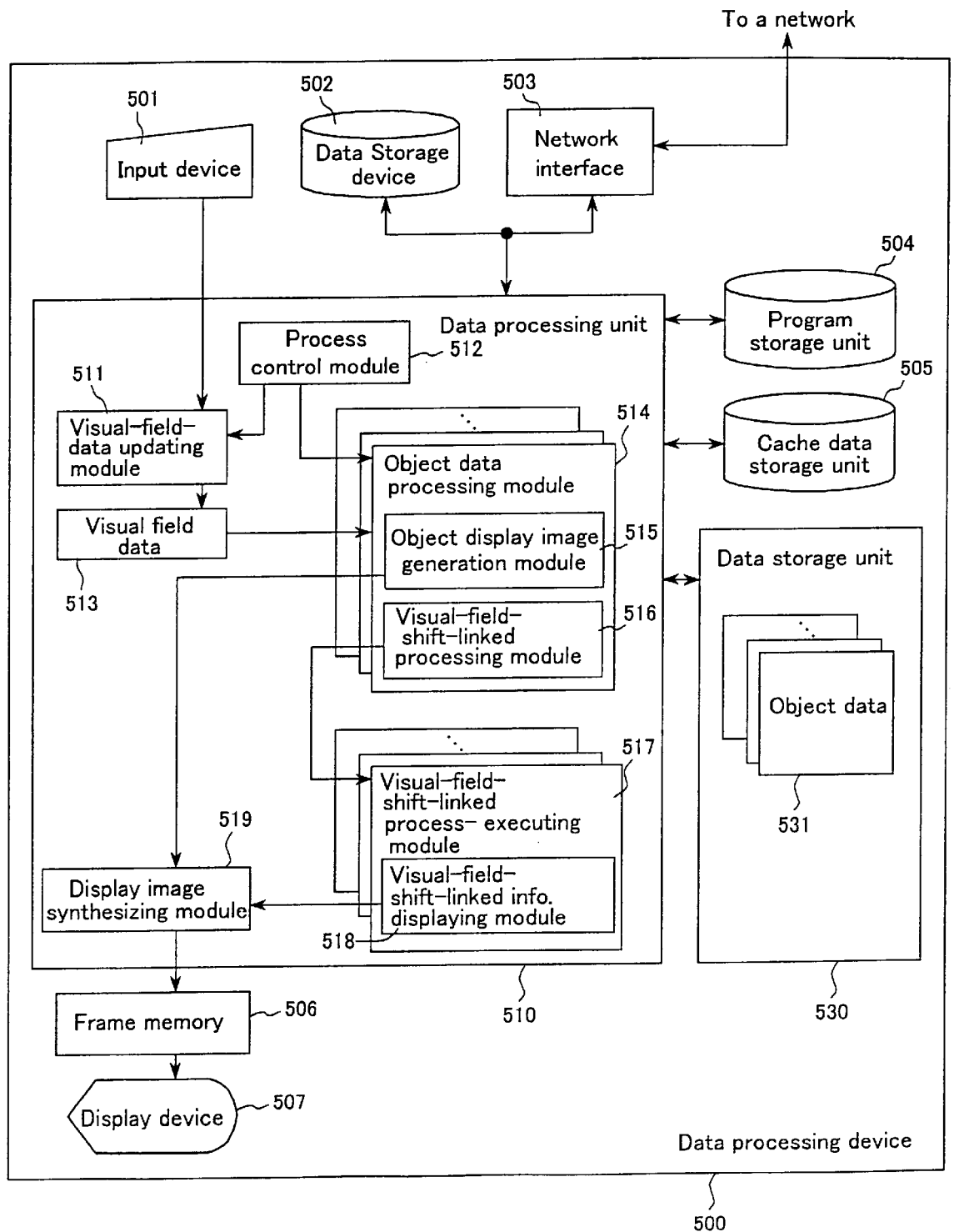
FIG. 1 is a functional block diagram illustrating the configuration of one embodiment of the present invention.

FIG. 1 is a control block diagram of an information-processing device employing a first embodiment of the present invention.

An information processing device 500, which can be a personal computer, workstation or other type of computer, includes an input device 501, which may be a keyboard, mouse or the like; an information storage device 502, which may be a hard disk, CD-ROM or other information recording device; a network interface 503, which is capable of connecting to the Internet, a LAN or the like; a program-storage unit 504, which may be a ROM, hard disk or the like; a cache data storage unit 505, comprising RAM or other memory; a display device 507, which may be a cathode ray tube, liquid crystal display or the like; a frame memory 506, which stores image data for images displayed on the display device 507; and a data processing unit 510, which generates image data to be displayed on the display device 507.

The data processing unit 510 comprises a CPU and memory, and includes: a process-control module 512, a visual-field-data updating module 511, an object-data processing module 514, visual-field-shift-linked process-executing module 517, and a display-image synthesizing module 519, among other modules. The configuration may be made to have object-data processing modules 514 and visual-field-shift-linked process-executing modules 517 of a number of different kinds, to correspond to types of data objects or types of visual-field-shift-linked processes; generally, these are realized in a form in which programs stored in the program-storage unit 504 are loaded onto memory and deployed.

Of the elements of the data processing unit 510, the process-control module 512 controls overall processing.

The visual-field-data updating module 511 accepts instructions relating to visual field movement inputted from the input device 501, moves a virtual viewpoint, and continuously shifts visual field data 513 within a virtual space seen from the virtual viewpoint.

The display-image synthesizing module 519 synthesizes the partial display images generated by the object-data processing module 514 and visual-field-shift-linked process-executing module 517, respectively, and generates an appropriate display image to be displayed on the display device 507.

Object data is stored in a data storage unit 530. Object data is information acquired via the network interface 503 or information stored in the information storage device 502, and is present as a plurality of items corresponding to data objects that are candidates for being placed in the virtual space and displayed.

Figure 2:
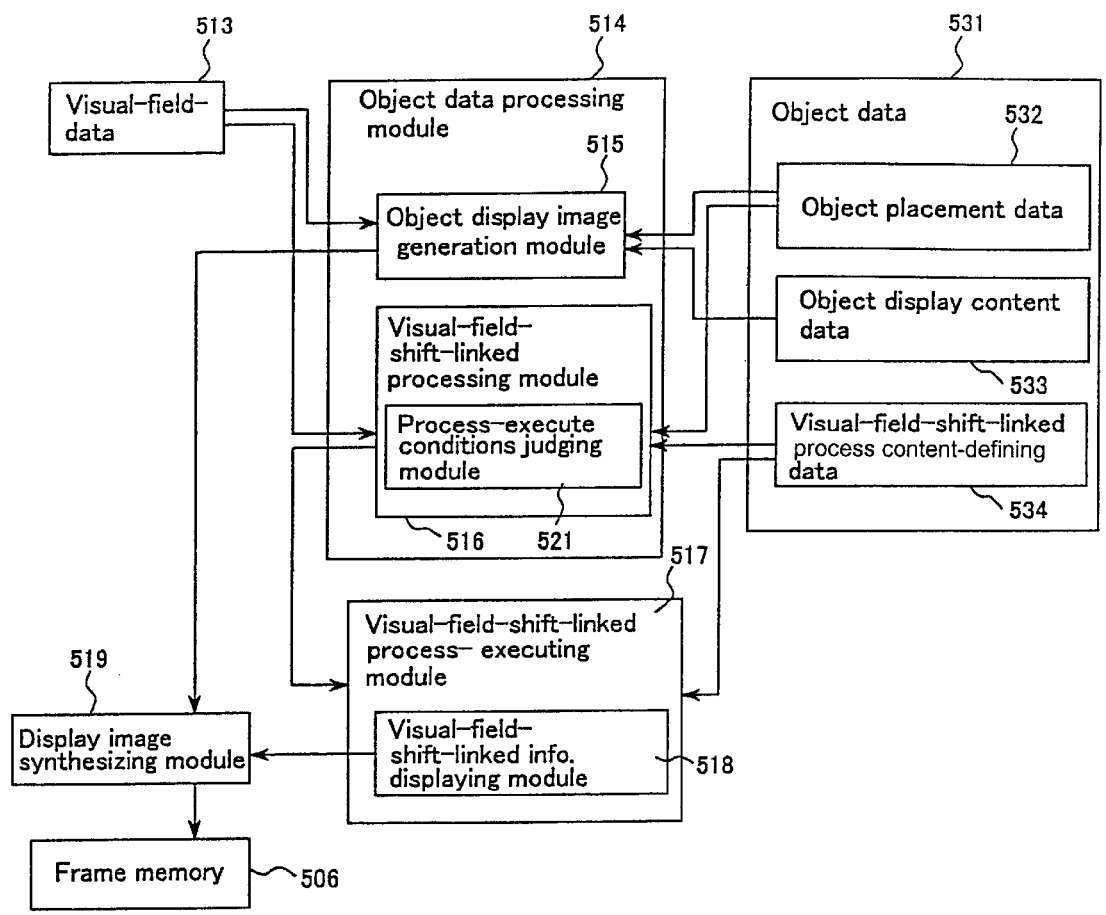
FIG. 2 is a functional block diagram illustrating a portion of FIG. 1 in greater detail.

As shown in FIG. 2, object data 531 stored in the data storage unit 530 includes: object placement data 532, which defines information relating to placement of a data object in a virtual space; object display content data 533, which defines display content for a data object; and visual-field-shift-linked process content-defining data 534, which defines the content of a process that is executed in conjunction with shifting the visual field, and, for executing that process, conditions that pertain to the geometric relation between the visual field and the target object.

The object-data processing module 514 carries out processes relating to a specified type of data object, and includes an object display image generation function unit 515 and a visual-field-shift-linked processing module 516.

In the object-data processing module 514, the object display image generation function unit 515 generates a data object display image based on the current visual field data 513 for a virtual space in which a plurality of data objects are placed. The object display image generation function unit 515, each time a new display image frame is generated, generates a display image for a data object that is to be displayed, based on the visual field data 513, object placement data 532, and object display content data 533, and writes this display image to the frame memory 506 via the display-image synthesizing module 519.

The visual-field-shift-linked processing module 516 refers to the visual field data 513, object placement data 532, and visual-field-shift-linked process content-defining data 534 to control execution of pre-set processes in conjunction with shifting the visual field. This visual-field-shift-linked processing module 516 includes a process-execute-conditions judging module 521, which based on the visual field data 513, object placement data 532, and visual-field-shift-linked process content-defining data 534, judges from the geometric relation between visual field and data object whether conditions have been met for executing preset processes in conjunction with visual field movement. The visual-field-shift-linked processing module 516 controls the processes of the visual-field-shift-linked process-executing module 517 based on the determination results of the process-execute-conditions judging module 521.

The visual-field-shift-linked process-executing module 517, in conformance with control functions of the visual-field-shift-linked processing module 516, executes processes designated in the visual-field-shift-linked process content-defining data 534. The visual-field-shift-linked process-executing module 517 includes a visual-field-shift-linked information displaying module 518; and of the processes designated in the visual-field-shift-linked process content-defining data 534, this visual-field-shift-linked information displaying module 518 generates display content for the display device 507, which it writes to the frame memory 506 via the display-image synthesizing module 519.

The configuration as described above enables the display of data objects while smoothly changing the display range by continuously shifting the visual field, in a virtual space in which a plurality of data objects are situated, and enables the execution of information display and like processes when predetermined geometric conditions between the visual field, the data objects in which they are pre-established, are met.

Process Flowchart

Figure 3:
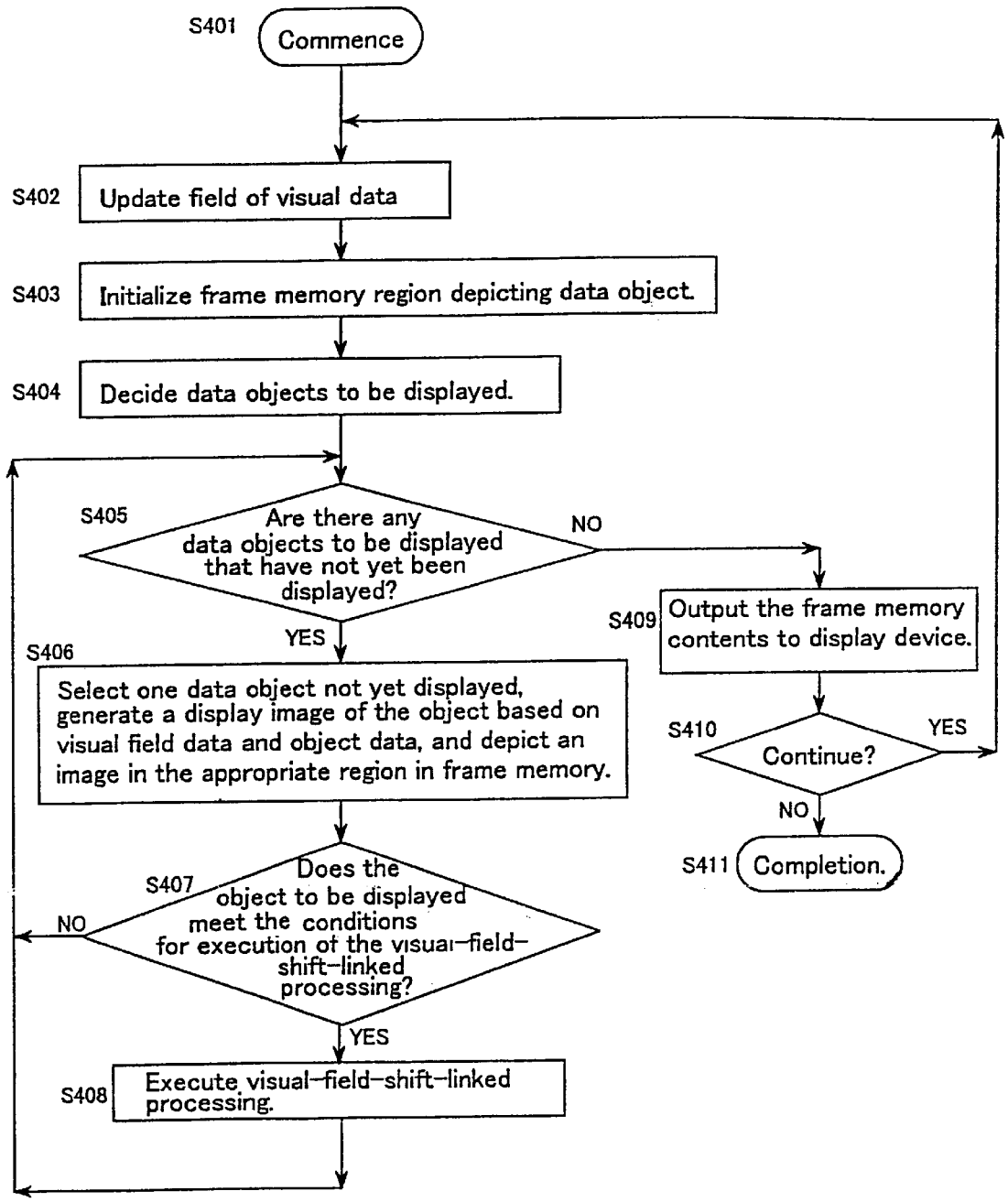
FIG. 3 is a control flowchart.

The flowchart shown in FIG. 3 will be used to explain the operations of the above-described information processing device 500.

When processing commences in Step S401, visual field data is updated in Step S402. Specifically, the visual field data 513 is updated by the visual-field-data updating module 511 based on instructions relating to visual field movement inputted from the input device 501.

In Step S403 a frame memory region (506) for depicting a data object based on the visual field in a virtual space is initialized.

In Step S404, based on visual field data and object data, the data object to be displayed is decided. Specifically, based on the current visual field data 513 and object data 531, and giving consideration to distance from viewpoint and link relation with other data objects, a data object that is present within the visual field is selected as the data object to be displayed. A plurality of data objects to be displayed can be selected.

In Step S405, determination is made of whether there are any data objects to be displayed that have not been displayed. If it is determined that there are data objects that have not yet been displayed, control proceeds to Step S406; if it is determined that there are no data objects that have not been displayed, control proceeds to Step S409.

In Step S406, one data object is selected from among the data objects that have not yet been displayed; based on visual field data 513 and object data 531, a display image of that data object is generated and depicted on the corresponding region of the frame memory 506 via the display-image synthesizing module 519.

In Step S407, it is determined whether the data object selected in Step S406 fulfills the conditions for execution of a visual-field-shift-linked process defined in the visual-field-shift-linked process content-defining data 534. For example, if the data object is present on an axial line that passes through the center of the display screen, and it appears in a size that is at least one-third of the display screen, it is determined that the conditions for executing the visual-field-shift-linked process are met, and control proceeds to Step S408; if the conditions are not met, control returns to Step S405.

In Step S408, based on the visual field data 513, object placement data 532 and visual-field-shift-linked process content-defining data 534, the visual-field-shift-linked process is executed. If in the visual-field-shift-linked process content data, there are instructions for information display on the display screen, display content is prepared by the visual-field-shift-linked information displaying module 518 and depicted on the corresponding region in the frame memory 506 via the display-image synthesizing module 519. Thereafter, control proceeds to Step S405.

In Step S409, the contents of the frame memory 506 are outputted to the display device 507.

In Step S410, it is determined whether or not to conduct a process for the next display-image frame. If the process for the next display-image frame is to be conducted, control proceeds to Step S402; if not, control proceeds to Step S411 and the process ends.

Figure 4:
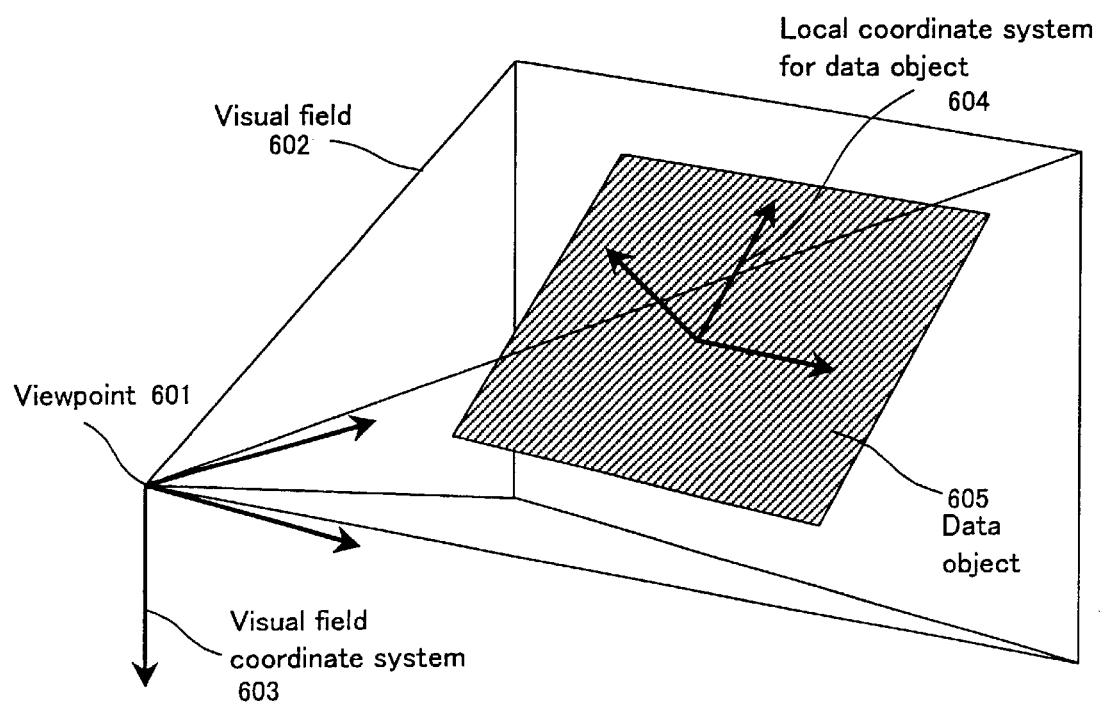
FIG. 4 is an explanatory diagram illustrating the geometric relationship between a visual field and a data object in a three-dimensional virtual space.
Figure 5:
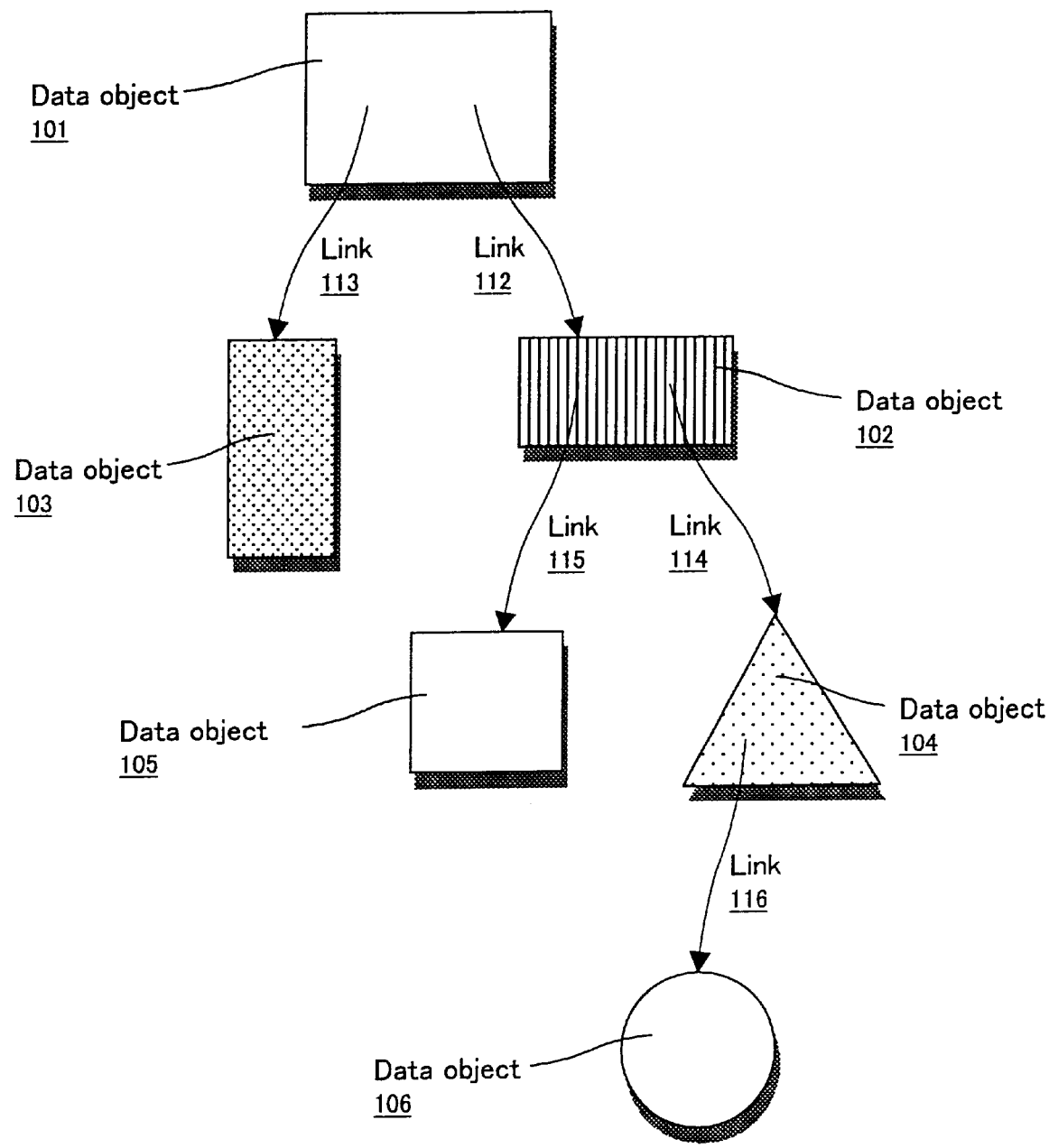
FIG. 5 is an explanatory diagram illustrating one example of the link structure of a group of data objects.
Figure 6:
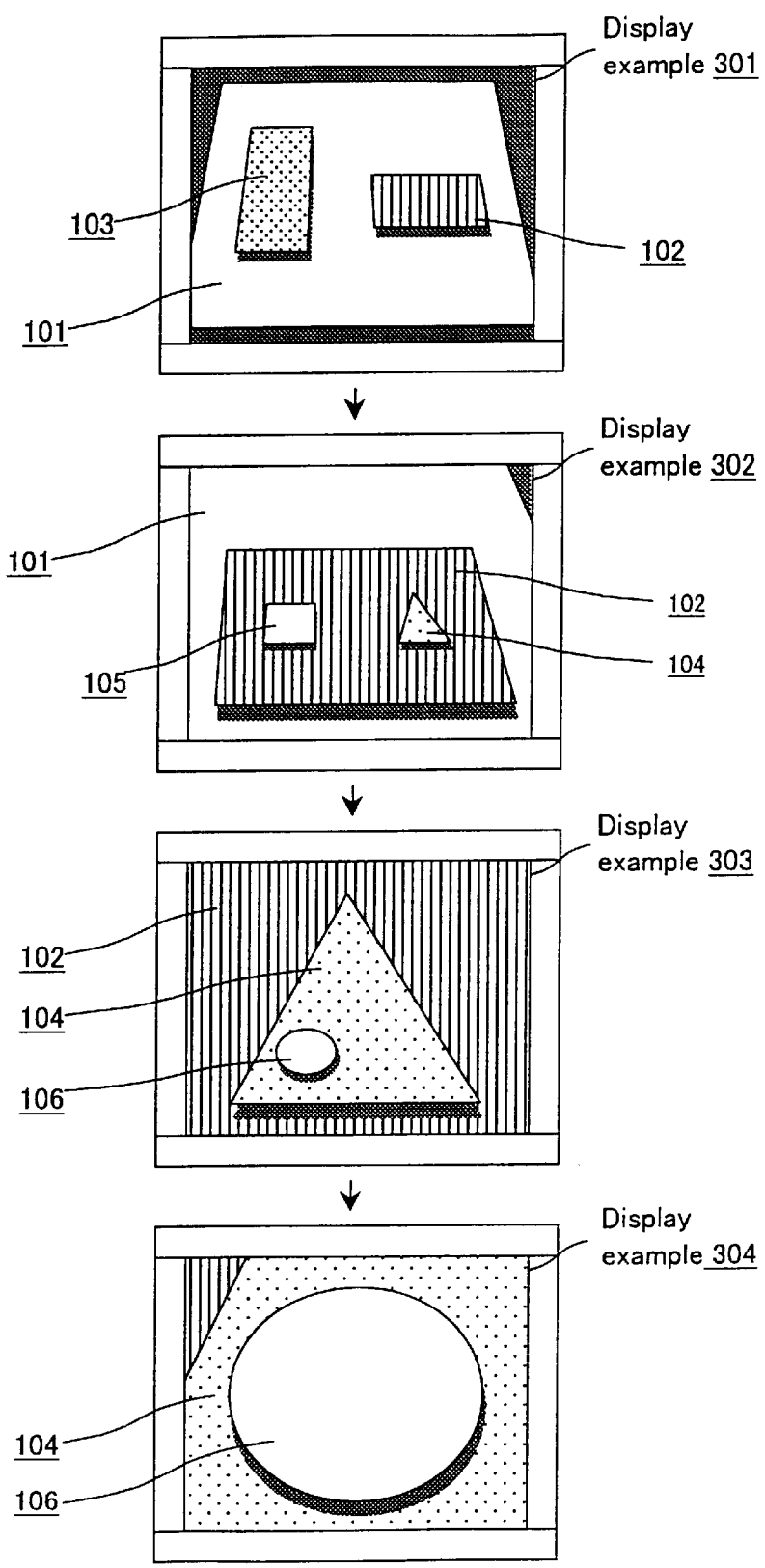
FIG. 6 is explanatory diagrams illustrating the link structure of a group of data objects, according to conventional technology.

The geometric relation between a visual field and data object in a three-dimensional virtual space can be represented, for example, as in FIG. 4.

A data object 605 placed within a three-dimensional virtual space will have its display conditions changed based on its relationship with a current viewpoint 601. As shown in the figure, the region within a pyramid having the viewpoint 601 as apex is the visual field displayed on the display screen. When the visual field changes because of shift of the viewpoint 601 and changes in the angle of elevation, the position of data object 605 relative to the visual field changes, and the display screen changes smoothly.

The determination of whether conditions have been met for execution of the visual-field-shift-linked process, said determination to be made in the process-execute-conditions judging module 521, can be determination of whether the relationship between visual field coordinate system 603 having viewpoint 601 as its origin and local coordinate system 604 having as its origin the central point of data object 605 meets specific conditions.

Data Object Link Structure

Figure 7:
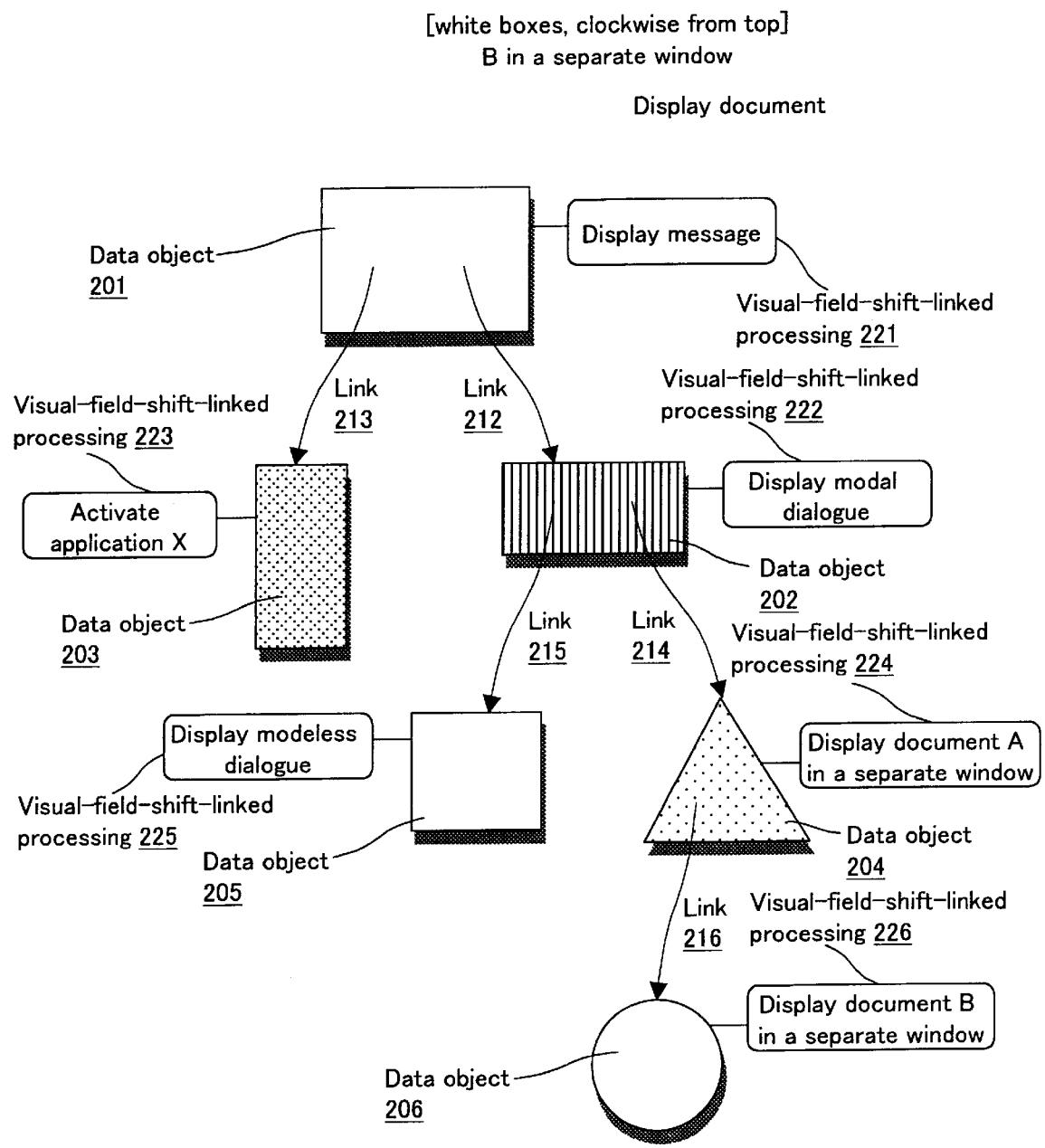
FIG. 7 is an explanatory diagram illustrating a link structure, as set out in the present invention, for data objects to be displayed.

One example of the link structure of data objects to be displayed will be explained using the schematic diagram of FIG. 7.

Visual-field-shift-linked processes 221 through 226 are attendant on data objects 201 through 206 concatenatedly linked by links 212 through 216.

In the example shown, links 212 and 213 for data objects 202 and 203 are provided in data object 201, attendant on which is a visual-field-shift-linked process 221 for displaying a message. Links 214 and 215 for objects 204 and 205 are provided in data object 202, attendant on which is a visual-field-shift-linked process 222 for displaying a modal dialogue.

A visual-field-shift-linked process 223 for activating application X is attendant on data object 203. A link 216 for data object 207 is provided in data object 204, attendant on which is a visual-field-shift-linked process 224 for displaying document A in a different window.

A visual-field-shift-linked process 225 for displaying a modeless dialogue is attendant on data object 205. A visual-field-shift-linked process 226 for displaying document B in a different window is attendant on data object 206.

When data objects 201 through 206, which are to be displayed, meet predefined conditions for execution of visual-field-shift-linked processes 221 through 226, these visual-field-shift-linked processes 221 through 226 are executed.

FIGS. 8 through 14 show examples of display screens for cases where viewpoint is shifted with regard to a group of data objects to be displayed, causing the visual field to shift.

Figure 8:
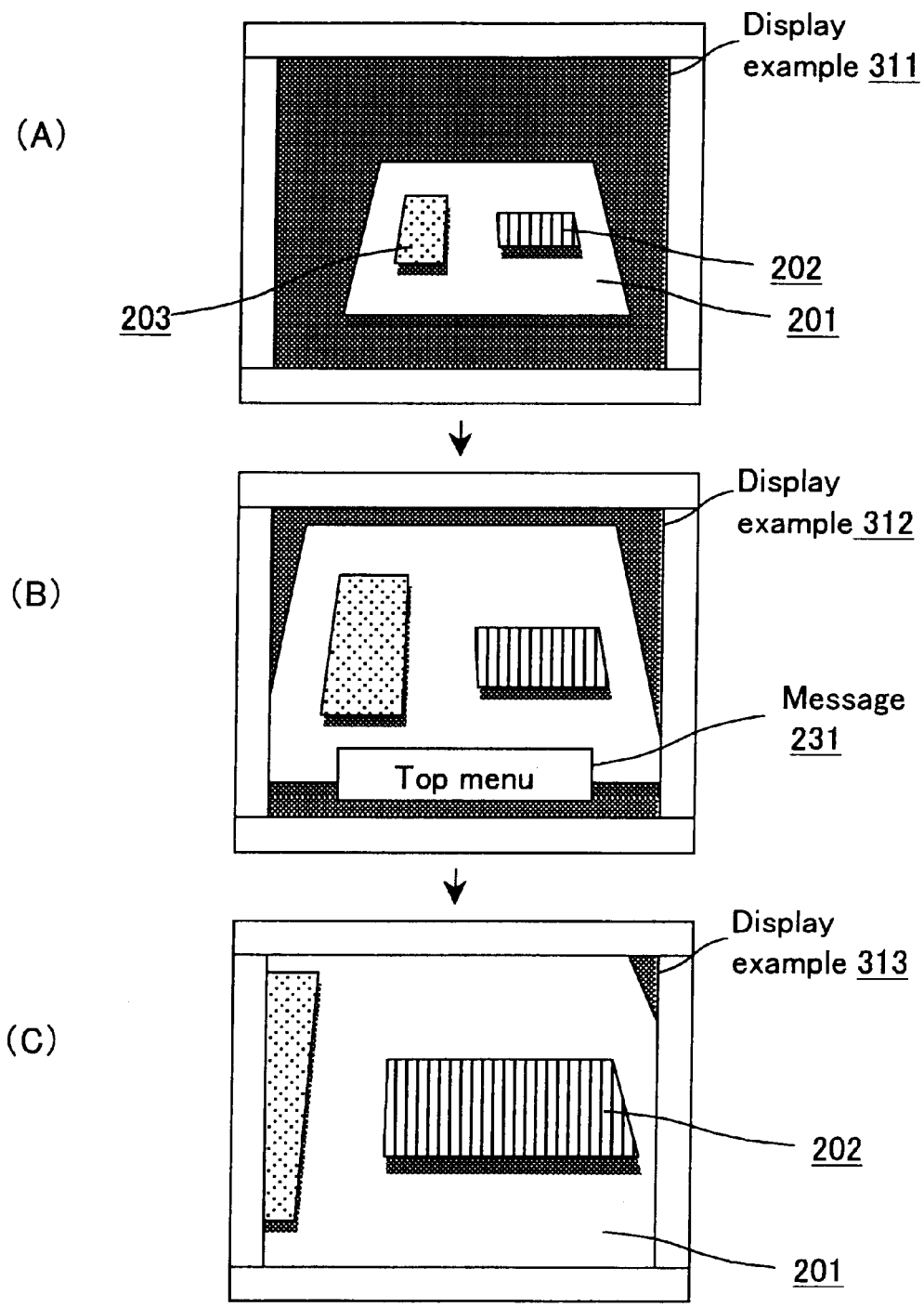
FIG. 8 is explanatory diagrams illustrating examples of message display linked to visual-field shift.

FIG. 8 shows a case where display of a message is linked to movement of the visual field.

In display example 311 at (A) in FIG. 8, data objects 201, 202 and 203 are displayed. In this state, none of the data objects 201 through 203 have met the conditions for executing their respective visual-field-shift-linked processes.

Display example 312 at (B) in FIG. 8 shows a state where the viewpoint has been moved forward, causing the entire visual field to advance, the data objects 201 through 203 are displayed larger than in display example 311. At such time, the conditions for executing visual-field-shift-linked process 221 attendant on data object 201 have been met, and so a message 231 is displayed.

Display example 312 at (B) in FIG. 8 shows a state where the viewpoint has been moved forward, causing the entire visual field to advance, and the data objects 201 through 203 are displayed larger than in display example 311. At such time, the conditions for executing visual-field-shift-linked process 221 attendant on data object 201 have been met, and so a message 231 is displayed.

Figure 9:
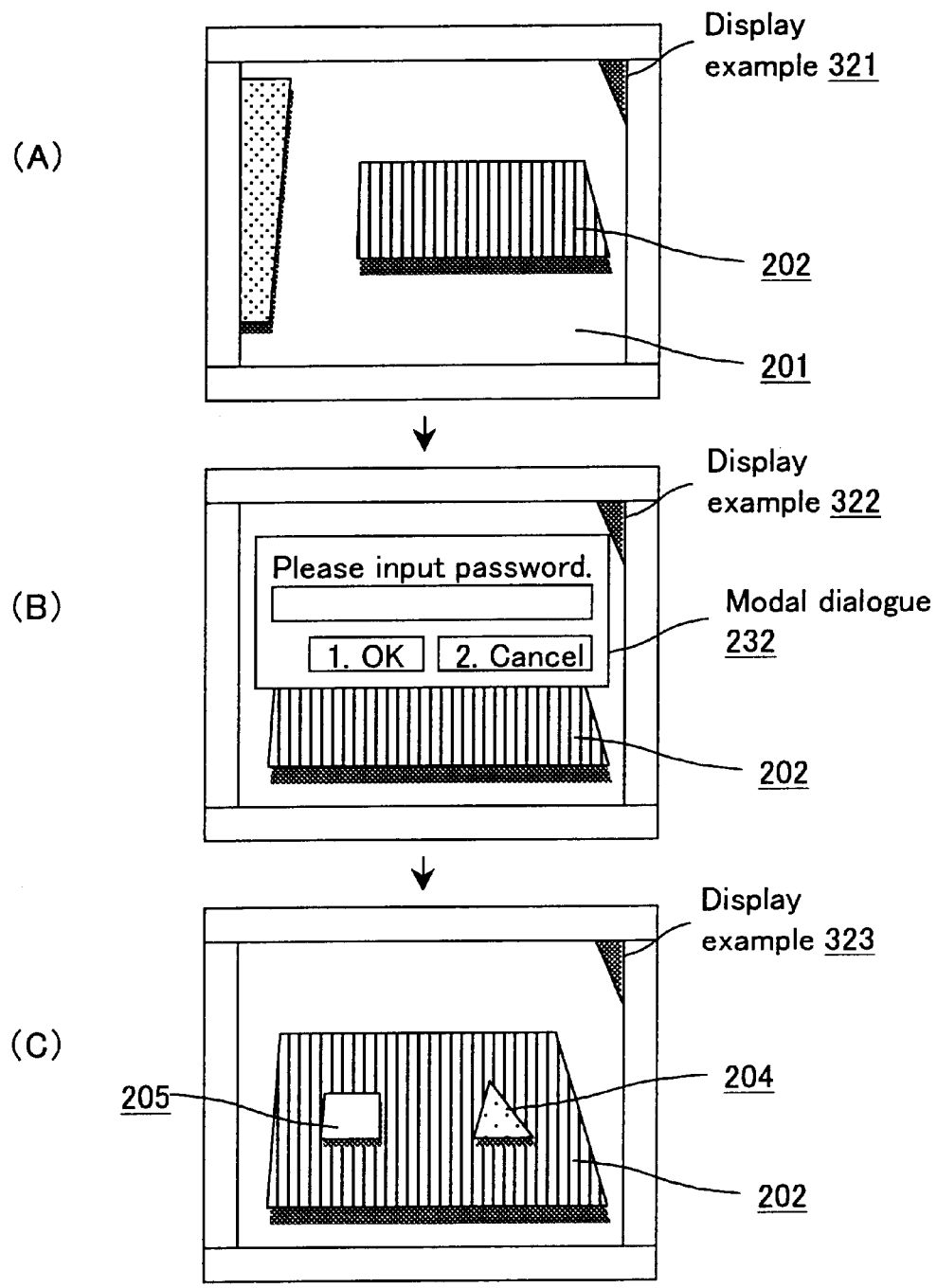
FIG. 9 is explanatory diagrams illustrating examples of modal-dialogue display linked to visual-field shift.

FIG. 9 shows a case where display of a modal dialogue is linked to movement of visual field. As used herein, a modal dialogue is a dialogue that, while it is being displayed, accepts no operations other than operations relating to the dialogue.

Display example 321 at (A) in FIG. 9 shows a state that is the same as in (C) in FIG. 8; data object 202 is displayed in the center foreground. Data objects 204 and 205 are linked to this data object 202; however, these are not yet displayed in this display example 321.

The display example 322 at (B) in FIG. 9 shows a state where the viewpoint has been moved slightly forward from the state in the display example 321; the conditions are met for execution of visual-field-shift-linked process 222 attendant on data object 202, and a modal dialogue 232 is displayed. The modal dialogue in this example displays a box for inputting a password, an OK function button and a cancel function button. In this state, visual-field-shift-linked process-executing module 517 is constituted to block any instructions relating to movement of visual field, and no operations are accepted other than inputting a determined password in the password input box and clicking on the OK function button, or clicking on the cancel function button.

When the proper password is inputted in the modal dialogue 232 of the display example 322 and the OK function button is clicked, visual-field-shift-linked process-executing module 517 ceases to block visual field movement instructions, and movement of visual field becomes possible again, and data objects 204 and 205 linked from data object 202 can now be displayed. This brings about the state shown in display example 323 at (C) in FIG. 9.

Figure 10:
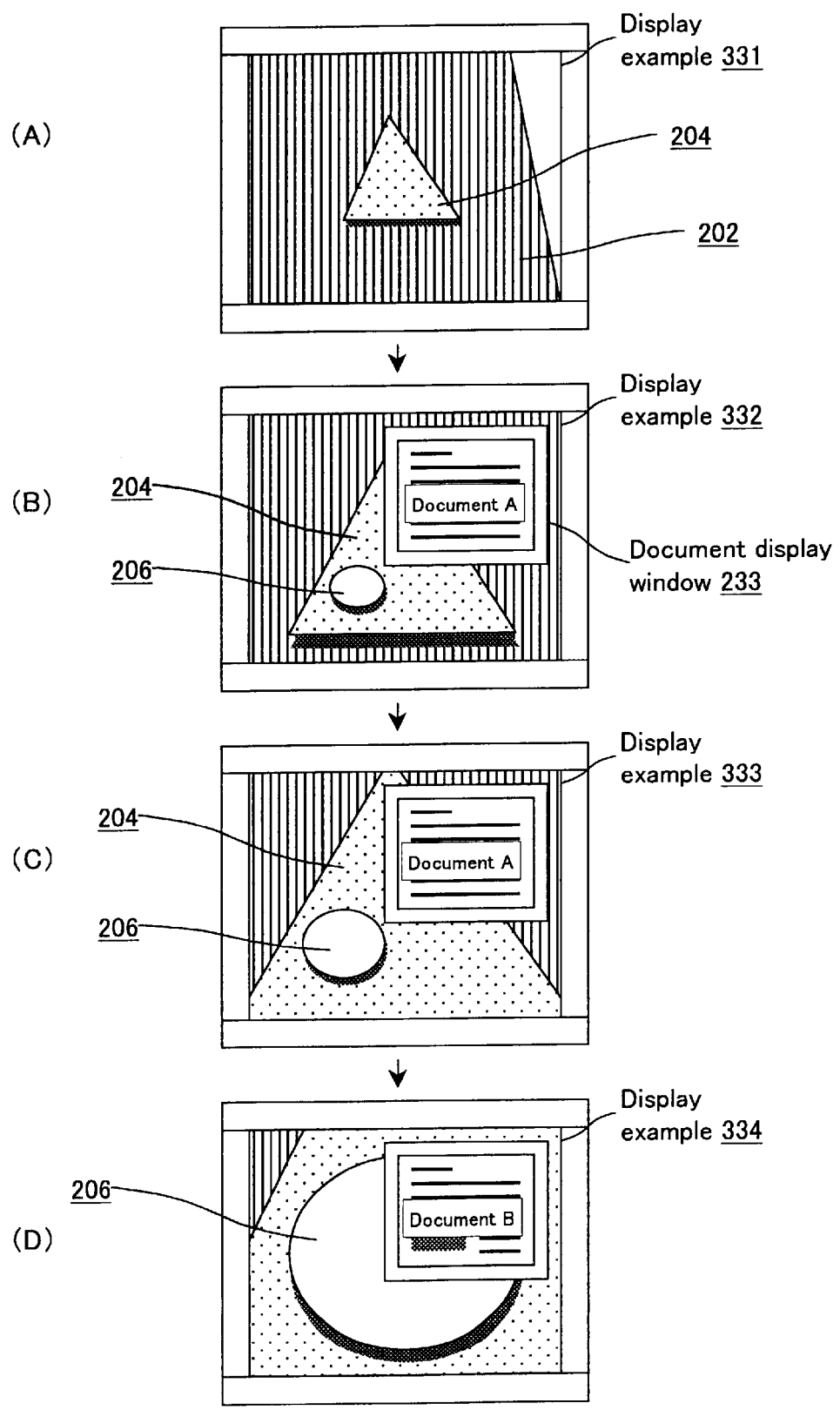
FIG. 10 is explanatory diagrams illustrating examples of related-information display linked to visual-field shift.

FIG. 10 shows a case where the display of information relating to a data object is linked with movement of visual field. As used herein, information relating to a data object is, for example, a web page relating to a data object to be displayed. In this example, information relating to a data object is displayed in a document display window 233 opened in front of a data object display image in the visual field of a virtual space on a display screen.

In display example 331 at (A) in FIG. 10, the visual field has been advanced even further than in display example 323 at (C) in FIG. 9, and the data objects 202 and 204 are displayed.

The display example 332 at (B) in FIG. 10 shows a state where the visual field has been moved slightly forward in comparison to display example 331; data object 204 is displayed large, and data object 206 linked with data object 204 is also displayed. In addition the conditions have been met for execution of visual-field-shift-linked process 224 attendant on data object 204; a document display window 233 is displayed in the foreground, and document A is displayed in this window.

The display example 333 at (C) in FIG. 10 shows a state where the visual field has been moved slightly forward in comparison to display example 332; the data objects 204 and 206 are displayed slightly larger. At this time, because the conditions for execution of visual-field-shift-linked process 224 have remained met, document A of the document display window 233 continues to be displayed. The document display window 233, the display position and size of which are not linked to visual field and thus do not change, is displayed in a fixed position on the display screen. The document display window 233 may be constituted so that the position thereof changes according to the display position of an important data object to be displayed, so as to avoid the area where such data object is being displayed.

The display example 334 at (D) in FIG. 10 shows a state where the visual field has been moved slightly forward in comparison to display example 333; data object 206 is displayed large. At this time, the conditions are met for execution of visual-field-shift-linked process 226 attendant on data object 206, and in place of document A document B is displayed in the document window 233.

Figure 11:
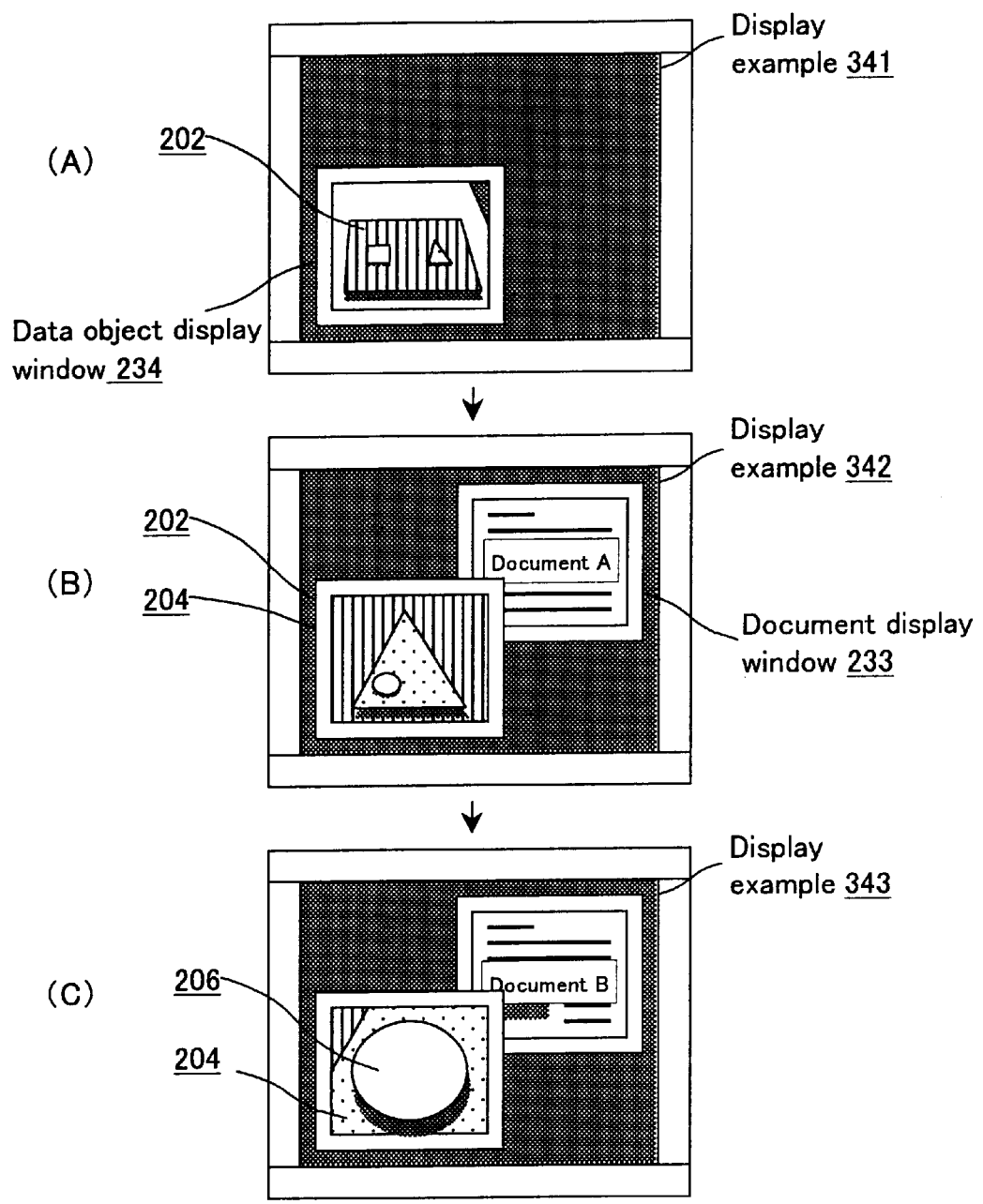
FIG. 11 is explanatory diagrams illustrating examples of display, linked to visual-field shift, of related information into a separate window.

FIG. 11 shows a case where a display image of a data object based on the visual field within a virtual space is displayed in a data object display window 234; in this figure, data object-related information linked to the movement of visual field is displayed, as in FIG. 10.

In the display example 341 at (A) in FIG. 11, data object 202 to be displayed is displayed in the data object display window 234. When the visual field of the data object display window 234 in display example 341 is moved forward so that the conditions are met for execution of visual-field-shift-linked process 224 attendant on data object 204, the document display window 233 pops up and the document A is displayed, as shown in display example 342 at (B) in FIG. 11. Similarly, when the conditions are met for execution of visual-field-shift-linked process 226 attendant on data object 206, document B is displayed within the document display window 233, as shown in display example 343 at (C) in FIG. 11.

Figure 12:
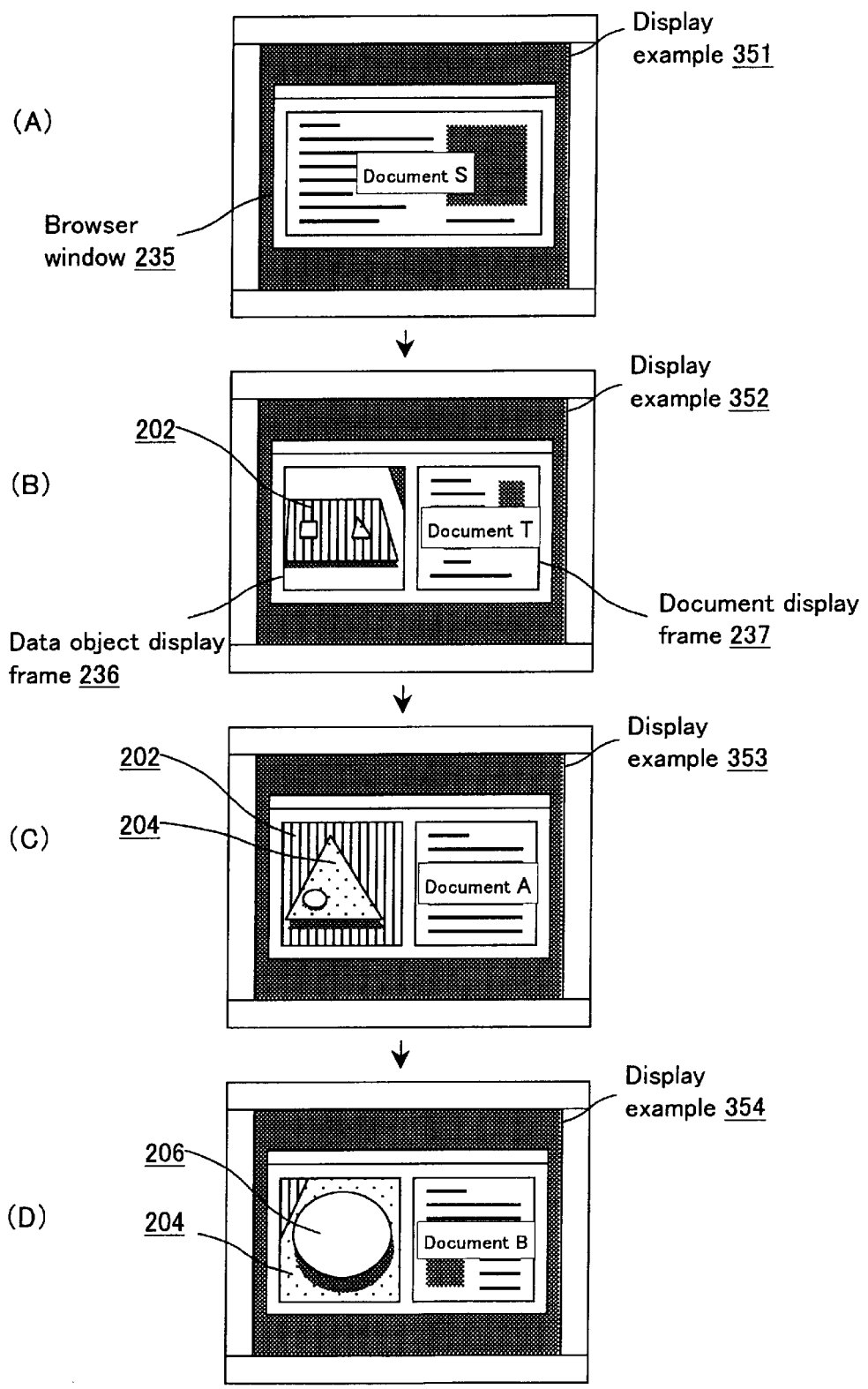
FIG. 12 is explanatory diagrams illustrating examples of display, linked to visual-field shift, of related information into a separate frame.

FIG. 12 shows an example of display image and related information of a data object based on the visual field in a virtual space being displayed in a separate frame within a browser window 235 on the display screen. In this case, too, as with FIG. 10 and FIG. 11, a case is shown where data object-related information linked to visual field movement is displayed.

In display example 351 at (A) in FIG. 12, a web browser such as Microsoft Internet Explorer™ is used, and document S is displayed within the browser window 235.

The display example 352 at (B) in FIG. 12 shows a state where in the document S displayed in display example 351, a link that calls up the next display has been clicked. Specifically, data object display frame 236 and document display frame 237 are displayed within the browser window 235; and data object 202 and others are displayed based on a visual field defined within a virtual space, and document T is displayed within the document display frame 237.

The display example 353 at (C) in FIG. 12 shows a state where the visual field is moved slightly forward from the state in the data object display frame 236 of the display example 352; data object 204 is displayed large, and the conditions are met for execution of visual-field-shift-linked process 224 attendant on data object 204, and document T in the document display frame 237 is replaced by document A.

The display example 354 at (D) in FIG. 12 shows a state where the visual field is moved slightly forward from the state in the data object display frame 236 of the display example 353; data object 206 is displayed large, and the conditions are met for execution of visual-field-shift-linked process 226 attendant on data object 206, causing document A in the document display frame 237 to be replaced by document B.

Figure 13:
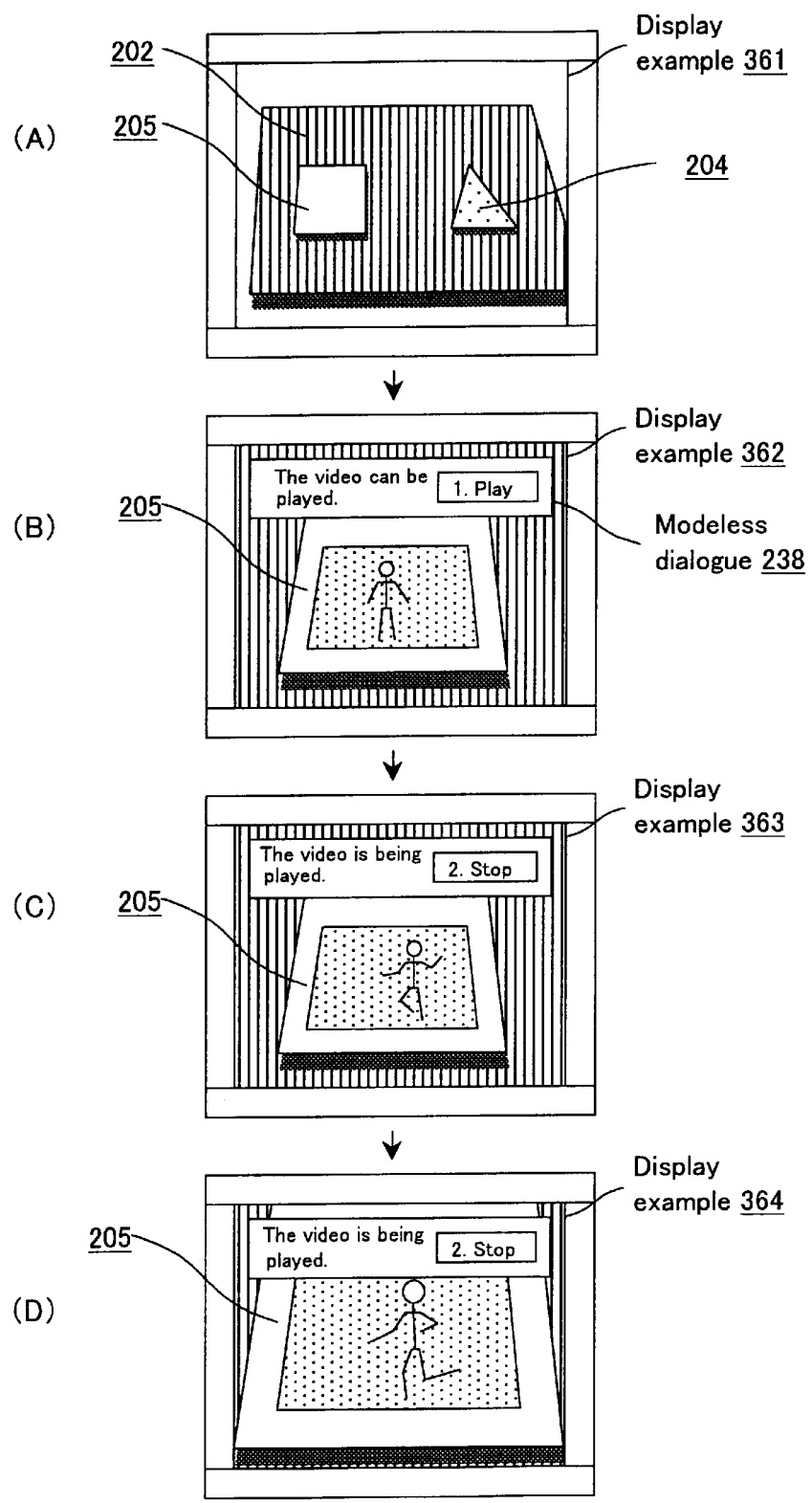
FIG. 13 is explanatory diagrams illustrating examples of modeless-dialogue display linked to visual-field shift.

FIG. 13 shows an example of display of modeless dialogue being linked to visual field movement. As used here, modeless dialogue is a dialogue such that operations not related to the dialogue are permitted even when the dialogue is displayed.

In the display example 361 at (A) in FIG. 13, the data objects 202, 204 and 205 are displayed.

The display example 362 at (B) in FIG. 13 shows a state where the visual field is moved slightly forward from the state in display example 361; data object 205 is displayed large, and the sample video image included in data object 205 is a still image. In this case the conditions are met for execution of visual-field-shift-linked process 225 attendant on data object 205, and so a modeless dialogue 238 is displayed. The modeless dialogue 238 in this example has a play button for giving instructions to play the video, making possible the playing of the video, a sample of which is displayed as a still image. The state where this modeless dialogue 238 is displayed differs from the state where a modal dialogue is displayed, as it is possible to move the visual field in this state.

The display example 363 at (C) in FIG. 13 shows the image displayed when the play button of the modeless dialogue 238 in the display example 362 has been clicked, and a video image is played on data object 205. In addition, as shown in the figure, while the video image is being played, there is display of a modeless dialogue having a stop button for stopping the video image.

The display example 364 at (D) in FIG. 13 shows a state where the visual field has been moved slightly forward from display example 363; data object 205 is displayed slightly larger, and the play of the video image continues.

Figure 14:
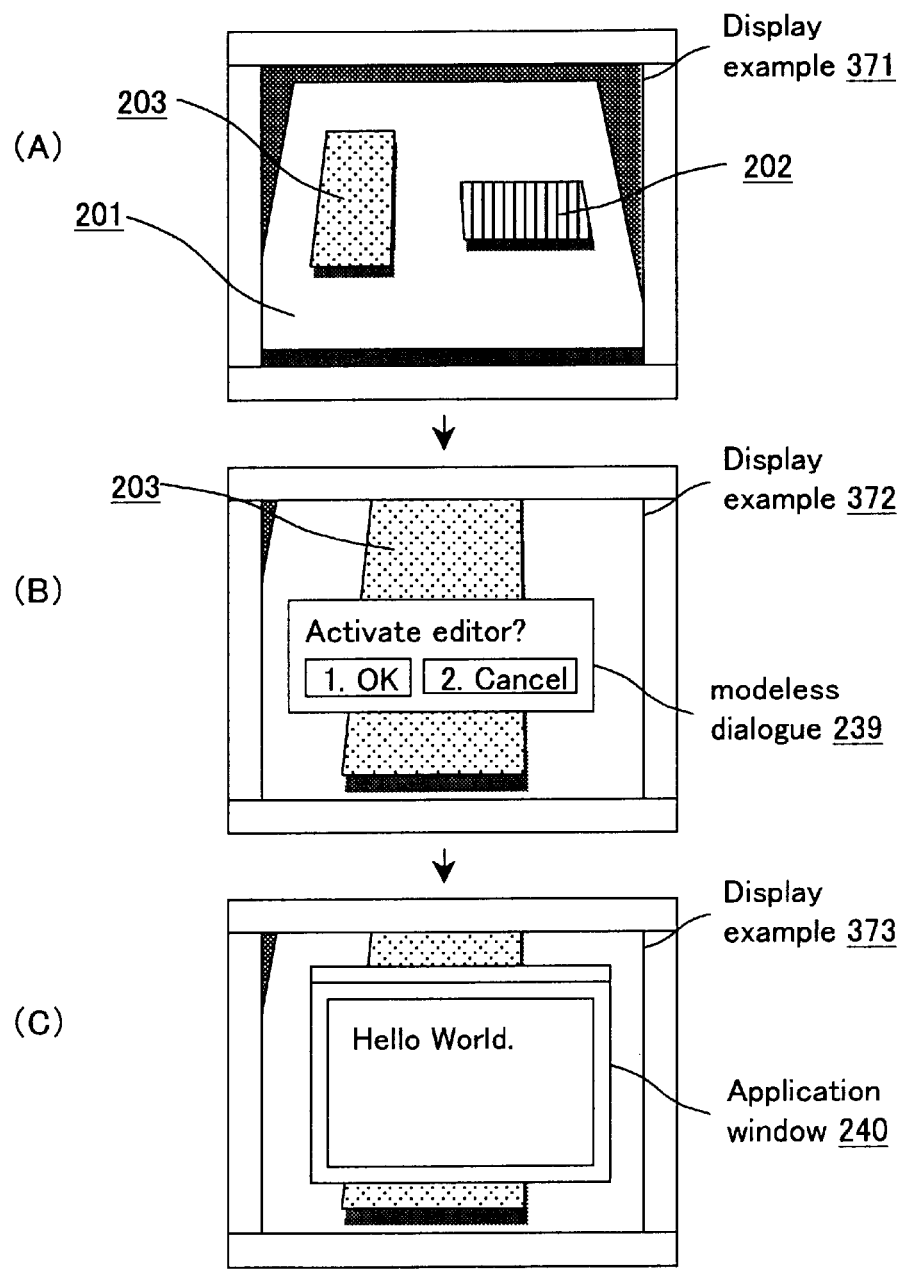
FIG. 14 is explanatory diagrams illustrating examples of application-execution display linked to visual-field shift.

FIG. 14 shows an example of the execution of an application linked to visual field movement.

In the display example 371 at (A) in FIG. 14, the data objects 201, 202 and 203 are displayed.

The display example 372 at (B) in FIG. 14 shows a state where the visual field has been moved slightly forward from the display example 371; data object 203 is displayed large, and the conditions are met for execution of the 223 attached to data object 203, causing the display of the modeless dialogue 239 for confirming whether to activate the application. This modeless dialogue 239 has an OK function button for activating the application and a cancel button; when the OK function button is clicked, the application is activated.

As shown at (C) in FIG. 14, when the OK function button is clicked, the modeless dialogue 239 is no longer displayed; in its place the application window 240 appears, and it is now possible to use the application.

Other Embodiments

In the above-described embodiments, determination of whether conditions for execution of the visual-field-shift-linked processes have been met is based on the geometric relationship between the visual field and the various data objects; other conditions, however, may be used. For example, priority values may be computed for all data objects to be displayed, the data object with the highest priority value is deemed the representative object, and determination of whether execution conditions have been met for the visual-field-shift-linked processes is made only for the representative object. Alternatively, conditions may be set that are unrelated to visual field movement.

For example, when a data object is positioned in the middle of the screen, and the size at which it appears is at least a predetermined proportion of the screen width (for example, at least one third), the visual-field-shift-linked process is executed. In such a case, if there are a plurality of data objects that meet execution conditions, priority in execution can be given starting those data objects that have a low order in the link relationship.

The present invention allows the viewing of multiple data objects placed in a virtual space as a visual field defined in that virtual space is fluidly shifted; the present invention also allows the display of additional information relating to a data object to be displayed, provides means for when dialogue with a user is required, and allows for the execution of application programs linked to data objects and related thereto.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

What is claimed is:

1. A data-object display method for situating a plurality of data objects within a three-dimensional virtual space in which a visual field is defined and displaying, from a set virtual viewpoint, data objects located within the visual field, the data-object display method including:
   accepting virtual-viewpoint location changes;
   continuously changing the visual field based on the virtual-viewpoint location changes, and uninterruptedly changing the display of a data object located within the visual field;
   distinguishing whether a data object located within the visual field satisfies predetermined geometric conditions for the visual field; and
   executing, in respect of a data object satisfying the predetermined geometric conditions, a process preset in the data objects,
   wherein the data object satisfying the predetermined geometric conditions lies on an axial line passing through a center of the visual field, and occupies at least one third of the visual field.

2. A data-object display method according to claim 1, wherein the process preset in the data object displays a display image different from a virtual-space display image located within the visual field.

3. A data-object display method according to claim 2, wherein a separate image is displayed situated in front of the data object located within the visual field in the virtual space.

4. A data-object display method according to claim 2, wherein a separate image is displayed within a window different from a window in which the data object located within the visual field in the virtual space is displayed.

5. A data-object display method according to claim 2, wherein a window includes a first and a second frame, a separate image is displayed within the first frame, and the data object located within the visual field in the virtual space is displayed in the second frame.

6. A data object display method according to claim 2, wherein at least one from among a message, a modal dialogue, a modeless dialogue or information related to the data object is displayed.

7. A data object display method according to claim 1, wherein the process preset in the data object executes a preset application program.

8. An information display device for situating a plurality of data objects within a three-dimensional virtual space in which a visual field is defined and displaying, from a set virtual viewpoint, data objects located within the visual field, the information display device including:
   visual-field-data updating means for accepting virtual-viewpoint location changes;
   object data processing means for continuously changing the visual field based on the virtual-viewpoint location changes, and uninterruptedly changing the display of a data object located within the visual field;
   process-execute-conditions judging means for distinguishing whether a data object located within the visual field satisfies predetermined geometric conditions for the visual field; and
   visual-field-shift-linked process-executing means for executing, in respect of a data object satisfying the predetermined geometric conditions, a process preset in the data objects,
   wherein the data object satisfying the predetermined geometric conditions lies on an axial line passing through a center of the visual field, and occupies at least one third of the visual field.

9. An information display device for situating a plurality of data objects within a three-dimensional virtual space in which a visual field is defined and displaying on a display screen, from a set virtual viewpoint, data objects located within the visual field, the information display device including:
   visual-field-data updating means for accepting virtual-viewpoint location changes;
   object data processing means for continuously changing the visual field based on the virtual-viewpoint location changes, and uninterruptedly changing the display of a data object located within the visual field;
   process-execute-conditions judging means for distinguishing whether or not there is a data object located on an axial line crossing a center of the display screen and occupying at least one third of the display screen; and
   visual-field-shift-linked process-executing means for executing a process preset in the data object, based on judgment results from said process-execute-conditions judging.

10. An information display device for situating a plurality of data objects within a three-dimensional virtual space in which a visual field is defined and displaying, from a set virtual viewpoint, data objects located within the visual field, the information display device including:
   visual-field-data updating means for accepting virtual-viewpoint location changes;
   object data processing means for continuously changing the visual field based on the virtual-viewpoint location changes, and uninterruptedly changing the display of a data object located within the visual field; and
   visual-field-shift-linked process-executing means for executing, if the distance of a data object located in the visual field from the virtual viewpoint becomes a predetermined value, a process preset in the data object, wherein the data object lies on an axial line passing through a center of the visual field, and occupies at least one third of the visual field.

11. An information display device for situating a plurality of data objects within a three-dimensional virtual space in which a visual field is defined and displaying, from a set virtual viewpoint, data objects located within the visual field, the information display device including:

a visual-field-data updating unit which accepts virtual-viewpoint location changes;

an object data processing unit which continuously changes the visual field based on the virtual-viewpoint location changes, and uninterruptedly changes the display of a data object located within the visual field;

a process-execute-conditions judging unit which distinguishes whether a data object located within the visual field satisfies predetermined geometric conditions for the visual field; and a visual-field-shift-linked process-executing unit which executes a process preset in the data object satisfying the predetermined geometric conditions wherein the data object satisfying the predetermined geometric conditions lies on an axial line passing through a center of the visual field, and occupies at least one third of the visual field.

12. A data-object display method for situating a plurality of data objects within a three-dimensional virtual space in which a visual field is defined and displaying, from a set virtual viewpoint, data objects located within the visual field, the data-object display method including:

accepting virtual-viewpoint location changes;

continuously changing the visual field based on the virtual-viewpoint location changes, and uninterruptedly changing the display of a data object located within the visual field;

distinguishing whether a data object located within the visual field satisfies predetermined geometric conditions for the visual field; and executing, in respect of a data object satisfying the predetermined geometric conditions, a process preset in the data object, wherein the data objects are interrelated by a and wherein the data object satisfying the predetermined geometric conditions lies on an axial line passing through a center of the visual field, and occupies at least one third of the visual field.

* * * * *

UNITED STATES PATENT AND TRADEMARK OFFICE
CERTIFICATE OF CORRECTION

PATENT NO. : 6,828,964 B2
DATED : December 7, 2004
INVENTOR(S) : Takushi Fujita et al.

It is certified that error appears in the above-identified patent and that said Letters Patent is hereby corrected as shown below:

<u>Title page,</u>
*Assistant Examiner*, change "*Assistant Examiner* Enrique L. Sautiago" to -- *Assistant Examiner* Enrique L. Santiago --.

<u>Column 11,</u>
Line 49, change "objects" to -- object --.

<u>Column 12,</u>
Line 29, change "objects" to -- object --.

<u>Column 13,</u>
Line 23, after "conditions" insert -- , --.

<u>Column 14,</u>
Line 17, delete "by a".

Signed and Sealed this

Second Day of August, 2005

JON W. DUDAS
*Director of the United States Patent and Trademark Office*